United States Patent [19]

Berman et al.

[11] 3,896,313

[45] July 22, 1975

[54] PHOTODETECTOR APPARATUS WITH A ZERO CUT-OFF RESPONSE TO ABSOLUTE ZERO AT A SPECIFIED LIGHT FREQUENCY

[75] Inventors: Herbert A. Berman, Lahaina, Hawaii; Robert B. Campbell, Pittsburgh; Wallace D. Loftus, Clairton, both of Pa.

[73] Assignee: Westinghouse Electric Corporation, Pittsburgh, Pa.

[22] Filed: Jan. 16, 1974

[21] Appl. No.: 433,959

[52] U.S. Cl. ............... 250/372; 250/211 J; 250/370

[51] Int. Cl. ............................................... G01t 1/24

[58] Field of Search .......... 250/370, 371, 372, 211 J

[56] References Cited

UNITED STATES PATENTS 3,504,181 3/1970 Chang et al. ..................... 250/211 J 3,609,364 9/1971 Paine et al. ......................... 250/372

*Primary Examiner*—Archie R. Borchelt

*Attorney, Agent, or Firm*—C. L. Menzemer

[57] ABSTRACT

A photodetector apparatus is provided having an output only when exposed to electromagnetic radiation above or below a specified cut-off frequency. At least first and second light sensor means produce electrical signals responsive to electromagnetic radiation of first and second overlapping frequency ranges, respectively, and peak electrical responses at different first and second peak frequencies, respectively. Electrical means compare the electrical signals from at least said first and second light sensor means and produces an electrical signal preferably of only one polarity and equal to a product of a first constant times the amplitude of the electrical signal produced by said first light sensor means minus a product of a second constant times the amplitude of the electrical signal produced by said second light sensor. The apparatus is particularly useful in ultraviolet detection where the sensor means are comprised of separate silicon carbide semiconductor bodies each containing a PN junction.

8 Claims, 5 Drawing Figures

PATENTED JUL 22 1975 SHEET 2 3,896,313

PHOTODETECTOR APPARATUS WITH A ZERO CUT-OFF RESPONSE TO ABSOLUTE ZERO AT A SPECIFIED LIGHT FREQUENCY

FIELD OF THE INVENTION

The present invention relates to photodetector apparatus and particularly photodetector apparatus responsive to electromagnetic radiation in specified frequency ranges.

BACKGROUND OF THE INVENTION

Photodetectors are old and well-known in the art. Such devices produce an electrical signal in response to the presence or absence of incident electromagnetic radiation. The radiation is typically in or adjacent to the ultraviolet, visible or infrared frequency ranges.

The spectral response of a photodetector is generally characterized by a well defined peak, with slowly decreasing responses as the frequency of the incident radiation varies above and below the frequency at which peak response occurs. The frequencies of zero response are remote from peak frequency, poorly defined and sometimes even absent. Further, some detectors exhibit multiple peak responses over the frequency range of radiation to which they are sensitive.

As a result, the electronic gain and in turn the sensitivity of the detector system is severely restricted. To illustrate, ultraviolet detectors of silicon carbide bodies with PN junctions have been used to detect fires and explosions. However, such detectors are also responsive to visible light radiation. And sunlight and ambient light is typically many orders of magnitude greater than the ultraviolet radiation to be detected. Thus, unless the electronic gain was limited, the ambient light or sunlight would also be of a sufficient level to actuate the detector and give a false alarm.

Various proposals have been made to overcome this problem. Specifically, the photodetector response has been tailored by use of optical filters, by redesign of the configuration and composition of the sensors, and by use of electronic thresholds for response. However, none of these proposals have been fully satisfactory. None of them can provide an absolute zero response at a specified frequency and under varying conditions of input intensity and frequency.

The present invention overcomes the difficulties with prior detectors. It provides a photodetector with a relatively abrupt cut-off in the response to absolute zero at a specified frequency of the incident electromagnetic radiation. Thus, a photodetector is provided which can be extremely sensitive to radiation within a certain frequency range without producing a corresponding electrical signal when radiated with light of an adjacent frequency range. Illustrative is an extremely sensitive ultraviolet photodetector for detection of a fire or explosion with the detector in bright sunlight.

SUMMARY OF THE INVENTION

A photodetector apparatus is provided with a relatively abrupt cut-off in the electrical output to absolute zero at a specified frequency of the incident electromagnetic radiation. The photodetector is comprised of at least first and second light sensor means and an electrical means.

The first light sensor means is capable of producing electrical signals responsive to electromagnetic radiation of a first frequency range and producing a peak electrical response at a first peak frequency. And the second light sensor means is capable of producing electrical signals responsive to electromagnetic radiation of a second frequency range and producing a peak electrical response at a second peak frequency. Where, said first frequency range overlaps said second frequency range; and said first peak frequency is different from said second peak frequency.

The electrical means is for comparing the electrical signals from the first and second light sensor means and generating an electrical signal equal to a product of a first constant times the amplitude of the electrical signal produced by said first light sensor minus a product of a second constant times the amplitude of the electrical signal produced by said second light sensor. The electrical means may be any one of a number of suitable and convenient embodiments. For example, the sensor means may be arranged to produce electrical signals of opposite polarity so that the electrical signal generated by the electrical means is simply the sum of the two electrical signals (where the first and second constants are both equal to one). Preferably, however, one or both of the electrical signals are processed before or during the comparing in the electrical means so that the electrical signal generated by the electrical means is in the functional form:

$$I_{\lambda R} = k_1 I_{\lambda A} + k_2 I_{\lambda B}$$

or $$V_{\lambda R} = k_1 V_{\lambda A} + k_2 V_{\lambda A}$$

where:

i. $I_{\lambda R}$ or $V_{\lambda R}$ is the electrical signal produced by the photodetector apparatus as either a current or voltage function;

ii. $I_{\lambda A}$ or $V_{\lambda A}$ is the electrical signal produced by said first light sensor means as either a current or voltage function;

iii. $I_{\lambda B}$ or $V_{\lambda B}$ is the electrical signal produced by said second light sensor means is either a current or voltage function; and iv. $k_1$ and $k_2$ are said first and second constants, respectively.

As can be readily seen from these functional equations, the present invention can be extended to any plurality of light sensor means producing electrical signals of like or opposite polarity.

Further, the electrical means preferably includes a rectifying means so that the electrical signal generated by the electrical means is of one polarity. Thus, apparatus does not respond to electromagnetic radiation either above or below the cut-off frequency, i.e. the frequency at which an absolute zero electrical response is found. That is, the electrical means can compare and produce a signal of either polarity.

Preferably, the light sensor means are each a semiconductor body having opposed first and second major surfaces. The body has a first impurity region of a given conductivity, i.e. N-type or P-type, adjoining the first major surface, and a second impurity region of an opposite conductivity, i.e. P-type or N-type, adjoining the second major surface and the first impurity region to form a PN junction therewith.

Still more preferred, the photodetector is preferably very responsive to ultraviolet radiation below a specified cut-frequency while being unresponsive to visible electromagnetic radiation. Specifically, the light sensor means are preferably comprised of separate silicon carbide semiconductor bodies each containing a singular PN junction.

Other details, objects and advantages of the invention will become apparent as the following description of the presently preferred embodiments thereof proceeds.

BRIEF DESCRIPTION OF THE DRAWINGS

Referring to the drawings, the presently preferred embodiments of the invention and presently preferred methods of performing the same are illustrated, in which.

DESCRIPTION OF THE PREFERRED EMBODIMENTS

Figure 1:
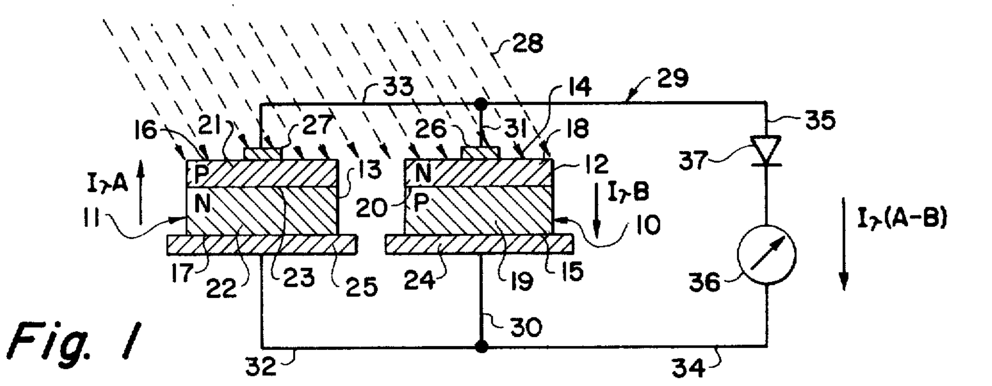
FIG. 1 is a schematic, partially in cross-section, of a photodetector apparatus embodying the present invention.

Referring to FIG. 1, a photodetector apparatus is shown having an electrical signal cut-off to absolute zero at a specified light frequency by addition of the electrical signal from first light sensor means 10 and the electrical signal from second light sensor means 11. The light sensor means generate electrical signals of opposite polarity. The first and second light sensor means produce electrical signals responsive to electromagnetic radiation of first and second overlapping frequency ranges, respectively, and peak electrical responses at different first and second peak frequencies, respectively.

Preferably light sensor means 10 and 11 are comprised of semiconductor bodies 12 and 13 having opposed first and second major surfaces 14 and 15, and 16 and 17, respectively. Body 12 has first N-type impurity region 18 adjoining first major surface 14 and second P-type impurity region 19 adjoining second major surface 15 and first impurity region 18 to form PN junction 20 therewith. Body 13 has first P-type impurity region 21 adjoining first major surface 16 and second N-type impurity region 22 adjoining second major surface 17 and first impurity region 22 to form PN junction 23 therewith. Both semiconductor bodies 12 and 13 have impurity regions of opposite conductivity adjoining the opposed major surfaces with a PN junction therebetween; however, the impurity regions are oppositely arranged so that the current flow through the semiconductors is in opposite directions.

Semiconductor bodies 12 and 13 ohmically connected to and supported by metal contacts 24 and 25, respectively, at second major surfaces 15 and 17, respectively. Also, metal contacts 26 and 27 make ohmic contact to semiconductor bodies 12 and 13 at first major surfaces 14 and 16, respectively, while leaving exposed major portions of surfaces 14 and 16 for irradiation by electromagnetic radiation beam 28.

The semiconductor bodies 12 and 13 are any semiconductor compositions depending upon the range of electromagnetic radiation to which the photodetector is to be responsive. For example, for infrared detection, the bodies may be composed of cadmium sulfide, silicon, gallium arsenide, germanium or indium phosphide; for visible light detection, the bodies may be composed of gallium phosphide; for ultraviolet detection, the bodies may be composed of silicon carbide; and for vacuum ultraviolet, the bodies may be composed of aluminum nitride. However, irrespective of the composition or compositions of the light sensor means, first and second light sensor means produce electrical signals responsive to electromagnetic radiation of first and second overlapping frequency ranges, respectively, and peak electrical responses at different first and second peak frequencies, respectively. It should be noted in this connection, that the responses from the sensor may have multiple peaks or subpeaks although such responses are not typical or preferred.

The photodetector apparatus is completed by electrical means 29 for electrically comparing the electrical signals from first and second light sensor means 10 and 11 and producing an electrical signal equal to the sum of the electrical signals produced by the light sensor means. Electrical means 29 is comprised of electrical leads 30 and 31 ohmically connected to metal contacts 24 and 26 on first light sensor means 10, and electrical leads 32 and 33 ohmically connected to metal contacts 25 and 27 on second light sensor means 11. Leads 30 and 32 are joined to electrical lead 34 and leads 31 and 33 are joined to electrical lead 35, which are connected to the terminals of ampmeter 36 through a suitable diode 37.

As previously noted, the currents [I $\lambda$ ] in the light sensor means (A and B) are in opposite directions upon radiation of the bodies by electromagnetic radiation beam 26. Thus, ampmeter 36 of electrical means 29, by summing the currents from light sensor means 10 and 11, reads the amplitude of the electrical signal of light sensor means 10 minus the amplitude of the electrical signal of light sensor means 11 [$I_\lambda$ (A-B)] so long as the current flow through diode 39 is of one polarity. The polarity of the electrical response at ampmeter 36 and in turn frequency range of electro-magnetic radiation to which the photodetector is responsive can be changed simply by changing the direction of the diode 37.

Figure 2:
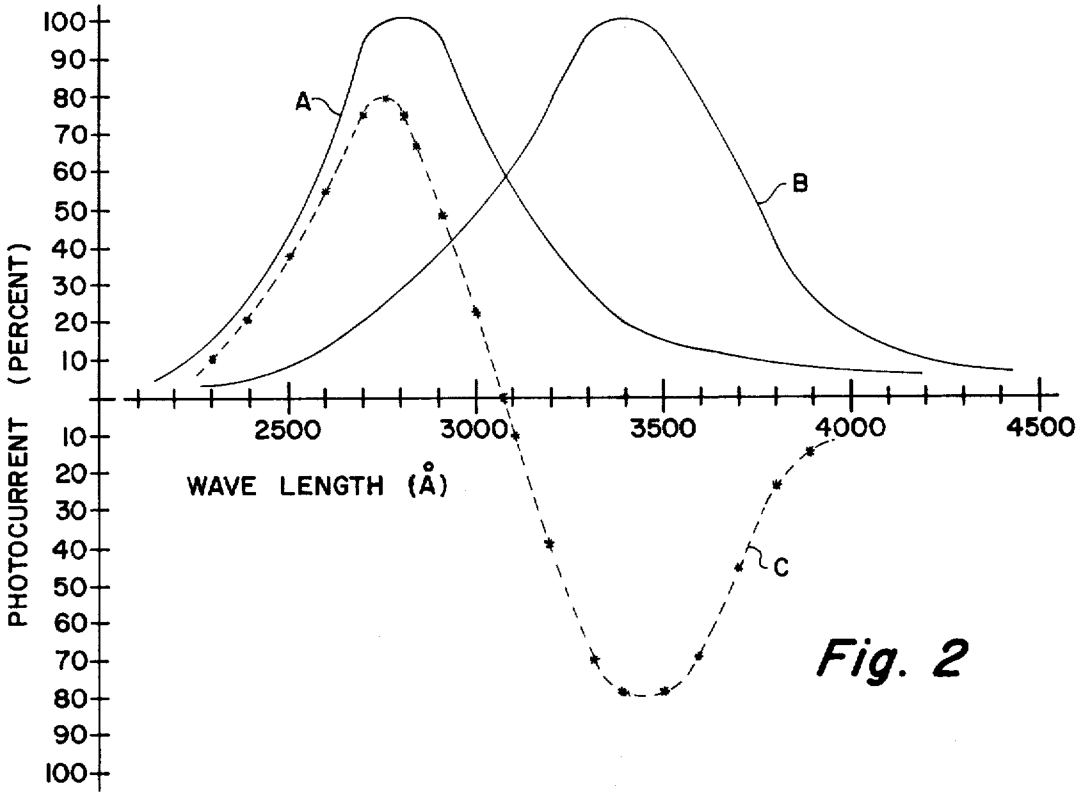
FIG. 2 is a graph illustrating the response of the photodetector apparatus shown in FIG. 1.

To better understand the operation, reference is made to the response curves of FIG. 2 for photodetector apparatus as described in FIG. 1. To illustrate, the light sensor means are ultraviolet sensors comprised of silicon carbide bodies each having a PN junction. Curve A is the percent photocurrent responses of light sensor 10; Curve B is the percent photocurrent response of light sensor 11; and Curve C is the resultant of the amplitude of Curve A minus the amplitude of Curve B. The curves are similar to actual observed responses.

The peak response from first light sensor 10 is with electromagnetic radiation at a wavelength of 2800 Angstroms, and the peak response from second light sensor 11 is with electromagnetic radiation at a wavelength of 3400 Angstroms. These peak responses are both in the ultraviolet range, and both sensors have some response in the vacuum ultraviolet and visible ranges. Thus, the frequency ranges of the electromagnetic radiations to which the light sensors are electrically responsive are overlapping but different. The resultant curve C has a peak electrical response with electromagnetic radiation at a wavelength of 2750 Angstroms and a zero electrical response with electromagnetic radiation at a wavelength of 3080 Angstroms. The photodetector is thus very sensitive to ultraviolet electromagnetic radiation without being sensitive to visible light radiation. The operation can also be reversed by reversing diode 37 so that the photodetector is very sensitive to visible light and radiation above a wavelength of 3080 Angstroms, while not being responsive to ultraviolet radiation below a wavelength of 3080 Angstroms.

The cut-off wavelength (3080A) (and frequency) of the photodetectors of FIGS. 1 and 2 is determined by the characteristics of the light sensor means. For this reason, the electrical signals from the sensors are typically electrically processed before and during the comparison of the signals. The electrical signal ($I_{\lambda R}$) produced by the electrical means will be in the form:

$$I_{\lambda R} = k_1 I_{\lambda A} - k_2 I_{\lambda B}$$

where: $I_{\lambda A}$ and $I_{\lambda B}$ are the electrical responses from the first and second light sensor means, respectively; and $k_1$ and $k_2$ are first and second time constants associated with conditioning of the respective signals. The electromagnetic frequency at which a zero electrical response is obtained is thus adjustable over a relatively wide frequency range by selection of the multiplying constants. For example, if the value of $k_1$ were set at 2 and of $k_2$ were set at 1, the wavelength of zero response for the example given in FIG. 2 would be 2550 Angstroms.

Specifically, electrical means 38 is comprised of electrical leads 39 and 40 ohmically connected to metal contacts 24' and 26' on first light sensor means 10', and electrical leads 41 and 42 ohmically connected to metal contacts 25' and 27' on second light sensor means 11'. Leads 39 and 41 are made common for balance. The photocurrent from light sensor 10' provides the input through leads 39 and 40 to current-to-voltage converter 43, where the electrical signal from sensor 10' is converted to a voltage variable signal. This conversion is required because of the relative magnitudes of the photocurrent, e.g. $10^{-10}$ -$10^{-19}$ amperes, and of the series resistance, e.g. $10^7$ to $10^9$ ohms. The transfer gain of the converter is typically at $10^9$ volts/ampere. In any case, the output of converter 43 is inputted by electrical leads 44 to the negative input to operational amplifier 45.

Similarly, the photocurrent from light sensor 11' provides the input through leads 41 and 42 to current-to-voltage converter 46, where likewise the electrical signal from sensor 11' is converted to a voltage variable signal. The output of converter 46 is inputted by electrical leads 47 also to the negative input of operational amplifier 45.

In the operational amplifier 45, the electrical signals from the light sensor means, which are of opposite polarity, are summed and at the resulting signal amplified. To complete the amplifier, the positive input of amplifier 45 is attached to ground by lead 48 and the output of amplifier 45 is fed back through lead 49 and resistor 50 to the negative input. The summed output of the amplifier 45 is fed through lead 51 and diode 52 to provide an electrical response from the photodetector of only one polarity.

Adjustment of the individual gains, $k_1$ and $k_2$, in the electrical signals from the light sensor means is typically made by selection of resistors 53 and 54, respectively, in input leads 44 and 47 to amplifier 45. The output voltage of the photodetector apparatus is governed by the functions: I.

$$E_o = \frac{R_F}{R_{1A}} \left[ KI\lambda_A - \left( \frac{R_F + R_{1A}}{R_F + R_{1B}} \right) (KI\lambda_B) \right]$$

$$\left| KI\lambda_A \right| > \left| \left( \frac{R_F + R_{1A}}{R_F + R_{1B}} \right) (KI\lambda_B) \right|$$

And:

II. $E_o = 0$ $$\left| KI\lambda_A \right| < \left| \left( \frac{R_F + R_{1A}}{R_F + R_{1B}} \right) (KI\lambda_B) \right|$$

where:

I $_A$ is the photocurrent of light sensor 10;

I $_B$ is the photocurrent of light sensor 11;

$K$ is the transfer gain in current-to-voltage converters 38 and 46;

$R_{1A}$ is the resistance of input resistor 53;

$R_{1B}$ is the resistance of input resistor 54; and $R_F$ is the resistance of feedback resistor 50.

From this equation it is clearly seen that the output ($E_o$) of the electrical means 38 is an electrical signal of one polarity and equal to a product of a first constant times the amplitude of the electrical signal produced by the first light sensor means 10' minus a product of a second constant times the amplitude of the electrical signal produced by the second light sensor means 11'.

Figure 3:
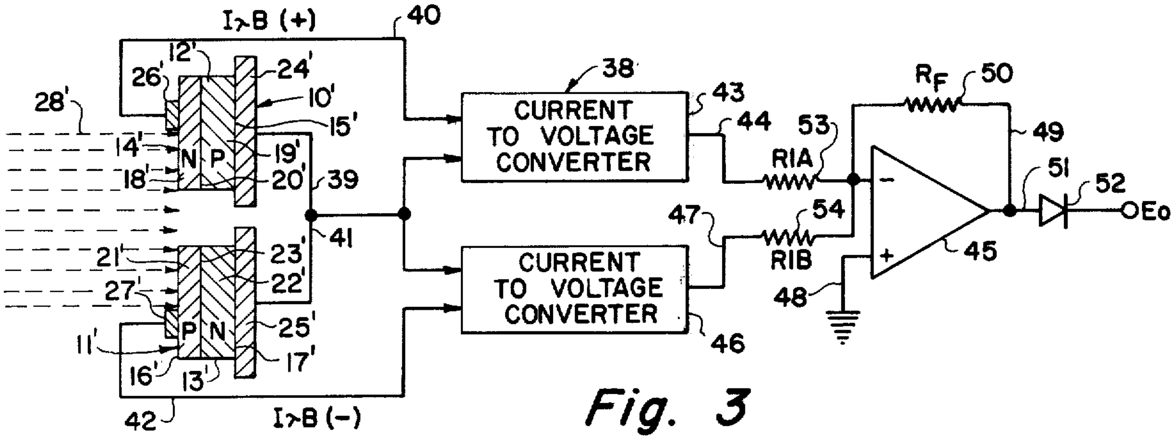
FIG. 3 is a schematic, partially in cross-section, of an alternative photodetector apparatus embodying the present invention.
Figure 4:
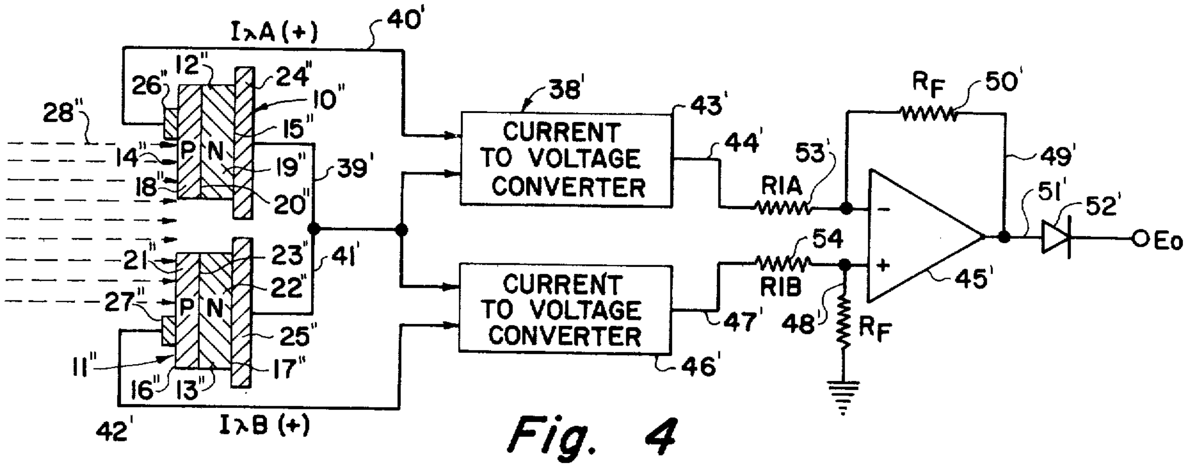
FIG. 4 is a schematic, partially in cross-section, of a second alternative photodetector apparatus embodying the present invention.

Referring to FIG. 4, a second alternative embodiment of the photodetector apparatus of the present invention is shown. All the elements are as described in connection with FIG. 3 except: (i) semiconductor body 10'' is reversed so that the electrical response signal thereof is of the same polarity as the electrical response signal of semiconductor body 11'', and (ii) the output from current-to-voltage converter 46'' through lead 47'' is connected at the positive input to operational amplifier 45'. Accordingly, a resistor equal to feedback resistor 50' is also provided in lead 48' to ground. Thus, to FIG. 3, the output voltage of the photodetector apparatus is governed by the functions: (I)

$$E_o = R_F \left( \frac{KI\lambda_A}{R_{1A}} - \frac{KI\lambda_B}{R_{1B}} \right)$$

for $$\left| \frac{KI\lambda_A}{R_{1A}} \right| > \left| \frac{KI\lambda_B}{R_{1B}} \right|$$

and

II. $Eo = o$ for $$\left| \frac{KI\lambda_A}{R_{1A}} \right| < \left| \frac{KI\lambda_B}{R_{1B}} \right|$$

It can be seen from the description in connection with FIGS. 3 and 4 that the invention can be embodied with any number of light sensor means of like or mixed polarity. It is simply a matter of coupling each converter output into the operational amplifier through the appropriate input and input resistor. Further, it should be noted that the electrical means may also be variously embodied with resistor networks or differential amplifiers as will be apparent to one skilled in the art from the foregoing description. In addition, a photovoltage instead of a photocurrent can be obtained from the light sensor means and processed in the same way.

Figure 5:
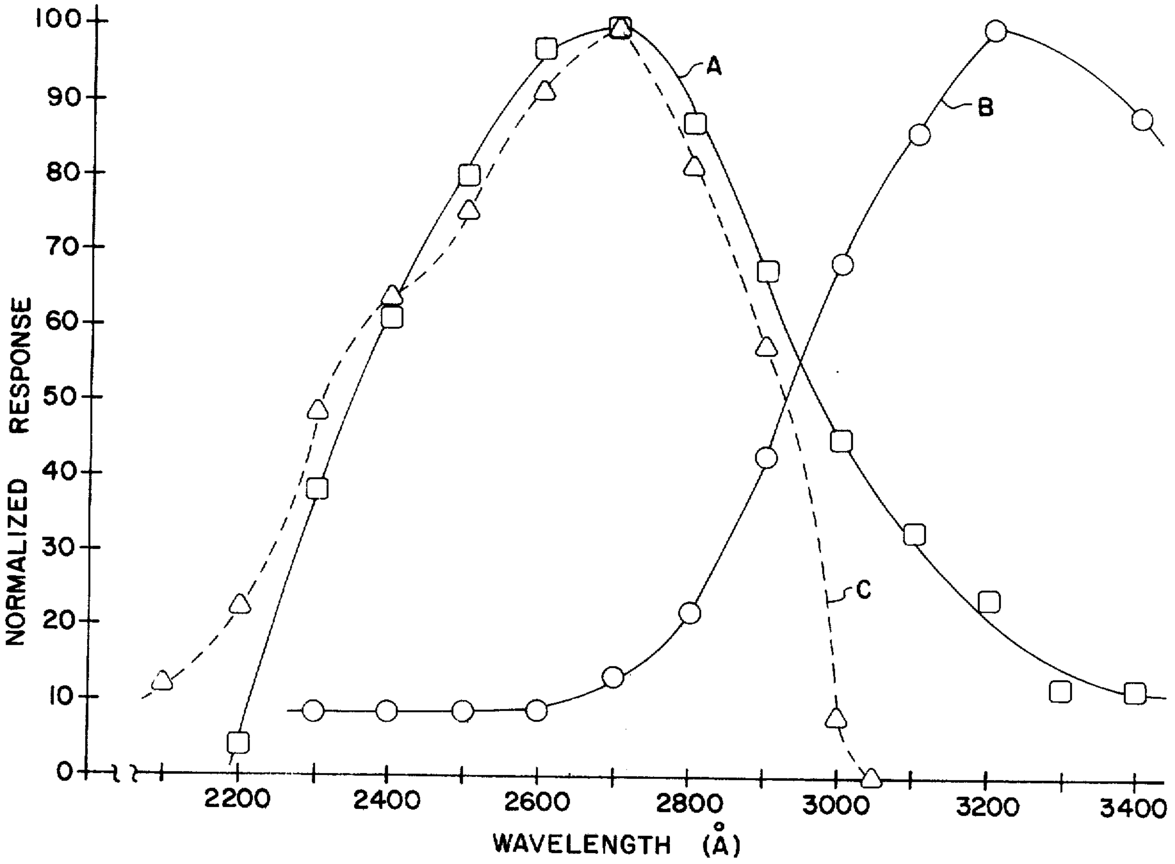
FIG. 5 is a graph showing the actual responses of a photodetector apparatus embodying the present invention.

To test the operation of the invention, a photodetector similar to that shown in FIG. 4 and described in connection therewith was built and tested. The light sensor means employed were silicon carbide semiconductor bodies each having a single PN junction. The data recorded during the second of four tests is shown in FIG. 5. The other tests provided similar data with the $k_1$ constant varied in the other three tests. The cut-off wavelength for the electrical response varied in the tests from 2820 Angstroms to 3400 Angstroms.

Referring to FIG. 5, Curve A is the electrical response from the first light sensor means; Curve B is the electrical response from the second light sensor means; and Curve C is the resulting electrical response from the photodetector apparatus. As can be readily seen, the actual responses are very similar to the anticipated responses as shown in FIG. 2.

While the present preferred embodiments of the invention have been described with particularity, it is distinctly understood that the invention may be otherwise variously embodied and used within the scope of the following claims. For example, the photodetector can be used as a two color pyrometer to measure temperature, particularly where the light sensor means are silicon carbide bodies containing singular PN junctions. Since the photocurrent from the sensors will change with temperature, the output signal from the photodetector will be proportional to temperature. The advantages over a conventional two-color pyrometer are: (i) no drift or aging; (ii) no mechanical chopper; (iii) no filters; (iv) all solid state; (v) high temperature capability; and (vi) small and lightweight. It is anticipated, however, that the embodiment using silicon carbide ultraviolet sensors is not applicable to measure temperatures below 1200°–1500°C because below those temperatures very little ultraviolet is present in the flame.

What is claimed is:

1. A photodetector apparatus comprising:

A. at least first and second light sensor means, said first light sensor means capable of producing electrical signals responsive to electromagnetic radiation of a first frequency range and producing a peak electrical response at a first peak frequency, and said second light sensor means capable of producing electrical signals responsive to electromagnetic radiation of a second frequency range and producing a peak electrical response at a second peak frequency, said first and second frequency ranges being overlapping and said first and second peak frequencies being different; and B. an electrical means for electrically comparing the electrical signals from at least said first and second light sensor means and producing an electrical signal equal to a product of a first constant times the amplitude of the electrical signal produced by said first light sensor means minus a product of a second constant times the amplitude of the electrical signal produced by said second light sensor means.

2. A photodetector apparatus as set forth in claim 1 wherein:

the electrical signal produced by the electrical means is of only one polarity.

3. A photodetector apparatus as set forth in claim 1 wherein:

the light sensor means each are comprised of a semiconductor body having opposed first and second major surface, said body having a first impurity region of a given conductivity adjoining the first major surface, and a second impurity region of an opposite conductivity adjoining the second major surface and adjoining said first impurity region to form a PN junction therewith.

4. A photodetector apparatus as set forth in claim 3 wherein:

the electrical signals produced by said first and second light sensor means are of opposite polarity, and the electrical signal produced by said electrical means is the sum of the products of the first and second constants times the respective electrical signals produced by said first and second light sensor means.

5. A photodetector apparatus as set forth in claim 3 wherein:

the electrical signals produced by said first and second light sensor means are of same polarity, and the electrical signal produced by said electrical means is the difference of the products of the first and second constants times the respective electrical signals produced by said first and second sensor means.

6. An ultraviolet photodetector apparatus comprising:

A. at least first and second light sensor means each comprised of a silicon carbide semiconductor body having a PN junction therein, said first sensor means capable of producing electrical signals responsive to electromagnetic radiation of a first frequency range and producing a peak electrical response at a first peak ultraviolet frequency, and said second sensor means capable of producing electrical signals responsive to electromagnetic radiation of a second frequency range and producing a peak electrical response at a second peak ultraviolet frequency, said first and second frequency ranges being overlapping and said first and second peak ultraviolet frequencies being different; and B. an electrical means for electrically comparing the electrical signals from at least said first and second light sensor means and producing an electrical signal of only one polarity and equal to a product of a first constant times the amplitude of the electrical signal produced by said first light sensor means minus a product of a second constant times the amplitude of the electrical signal produced by said second light sensor means.

7. An ultraviolet photodetector apparatus as set forth in claim 6 wherein:

the electrical signals produced by said first and second light sensor means are of opposite polarity and the electrical signal produced by said electrical means is the sum of the products of the first and second constants times the respective electrical signals produced by said first and second light sensor means.

8. An ultraviolet photodetector apparatus as set forth in claim 6 wherein:

the electrical signals produced by said first and second light sensor means are of same polarity and the electrical signals produced by said electrical means is the difference of the products of the first and second constants times the respective electrical signals produced by said first and second sensor means.

* * * * *